United States Patent Office 3,789,043
Patented Jan. 29, 1974

3,789,043
ELASTOMER STABILIZATION WITH
LIGNIN-BASED MATERIALS
Sten I. Falkehag, Mount Pleasant, and David V. Braddon, Charleston Heights, S.C., assignors to Westvaco Corporation, New York, N.Y.
No Drawing. Filed July 3, 1972, Ser. No. 268,593
Int. Cl. C08d 9/02, 9/12
U.S. Cl. 260—17.5                    7 Claims

ABSTRACT OF THE DISCLOSURE

Elastomers may be protected against atmospheric degradation by the addition thereto of 0.01 to 5.0 parts by weight, preferably 0.25 to 2.0 parts, per 100 parts of elastomer of a modified lignin stabilizer. The modified lignin stabilizers are produced by heat treating technical lignins in the presence of a nucleophile, such that a portion of the original guaicyl structures are converted to catechols via a demethylation reaction.

BACKGROUND OF THE INVENTION (1) Field of the invention

This invention relates to stabilizing elastomers against degradation with lignin-based materials. More particularly, this invention relates to the use of nucleophile and heat-treated technical lignin, referred to hereinafter as NHT lignin, to stabilizer elastomers against atmospheric degradation.

(2) The prior art

Most organic polymeric materials are prone to oxidative degradation during manufacture, processing, storage and in service. Such polymers include natural and synthetic elastomers as well as plastics, and particularly those polymers which contain processing or catalytic residues therein and which are subject to rapid degradation in physical properties upon use or exposure to heat, light, or atmospheric oxidants. The rate of degradation depends primarily on the composition of the polymer and the conditions of exposure to oxygen, ozone, heat, and light. These adverse effects may be greatly retarded in most materials by the use of stabilizers and antioxidants. Stabilizers and antioxidants then are substances that retard the degradative effect of oxidation and thereby extend the polymer's useful temperature range and service life when added in low concentrations. For the purpose of this specification the terms "stabilizer" and "antioxidant" will, for the sake of simplicity, be referred to interchangeably. The concentration employed depends on the structure, processing conditions, impurities and end use of the polymer. It is common practice to include in polymers, such as elastomers, small amounts of from about 0.01 to 5.0 percent by weight of an antioxidant.

J. R. Sheldon (Rubber Chemistry and Technology, vol. 45, No. 2, Apr. 15, 1972, pages 356–380) reviews the mechanisms of oxidation and antioxidation. Antioxidants act by inhibiting the formation of free radicals in the initiation step or by interrupting the propagation cycle. The formation of free radicals may be prevented by light absorbers, metal deactivators or peroxide decomposers. Materials that interrupt the propagation cycle are called free radical scavengers or inhibitors and are usually phenols or amines. Sheldon further notes that materials used as antioxidants are frequently capable of preventing degradation in more than one way. The mechanisms by which the stabilizers used in this invention perform are directly related to the free radical chain reaction described in the Sheldon reference.

Murray and Watson (India Rubber World, vol. 118, August 1948, pages 667–669) teach that unoxidized soda pulp lignin is a stabilizer for styrene-butadiene rubber (SBR). However, such lignin is not presently used as a stabilizer.

This invention is directed to improved stabilizers and antioxidants for elastomers. Therefore, it is a general object of this invention to stabilize elastomers against degradation through the addition thereto of certain lignin-based materials. Another object of this invention is to provide a NHT lignin useful as a stabilizer and antioxidant for prevention of degradation of elastomers.

Other objects, features and advantages of this invention will become evident from the following detailed description of the invention.

SUMMARY OF THE INVENTION

It has been found that addition to an elastomer of 0.01 part to 5.00, preferably 0.25 to 2.0, parts by weight per 100 parts of elastomer of certain NHT lignins is effective as a stabilizer against degradation. These materials act primarily as free radical scavengers but may also act as light absorbers, metal deactivators or peroxide decomposers. The NHT lignins effective as stabilizers are those materials that have a portion of their original guaicol structures demethylated and contain more than 0.35 catechol groups per 1000 grams of NHT lignin.

DETAILED DESCRIPTION OF THE INVENTION

It has been found that NHT lignin is useful as a stabilizer to protect elastomers against degradation. The NHT lignin may be added to the elastomer while the elastomer is in latex or emulsion form, suspension form, dispersion form or solution form. The NHT lignin may also be added to dry elastomer using any of the conventional dry mixing means such as an open mill, an extruder or an internal mixer such as a Banbury mixer. The form in which the NHT lignin is added to the elastomer latices, suspensions, etc. will depend on such factors as the solubility of the components and whether they are liquids or solids. It may be added directly or in the form of emulsions, suspension or solutions. The amounts of the NHT lignin that are used as a stabilizer are from about 0.01 to about 5.0 parts, and preferably from about 0.25 to about 2.00 parts, by weight per 100 parts of elastomer. The amount of NHT lignin necessary for a given degree of stabilization will vary depending on the type of elastomer being stabilized. For example, in raw synthetic rubber the level of stabilizer addition is preferably 0.7 to 1.7 parts by weight per 100 parts of rubber.

Billmeyer (Textbook of Polymer Science, Interscience, 1965 p. 180) defines elastomers as high polymers that are above their glass transition temperature, amorphous in their stable (unstressed) state, and contain a network of crosslinks. As employed in this application, the term "elastomer" applies to natural and synthetic rubber. Synthetic rubber includes polymers and copolymers that possess the properties listed by Billmeyer and are prepared from various conjugated dienes and mono olefins. Representative examples of the synthetic rubbers used in the practice of this invention are homopolymers of a conjugated diene such as 1,3-butadiene, isoprene or chloroprene and copolymers of a conjugated diene such as isoprene or butadiene with at least one copolymerizable ethylenically unsaturated monomer such as isobutylene, styrene, acrylonitrile, unsaturated carboxylic acids, or other substituted vinyl derivatives. Typical commercial examples of the synthetic rubbers used in the practice of this invention are styrene-butadiene, butadiene, cis-butadiene, neoprene, butyl, urethane, nitrile, polysulfide, acrylate, silicone, fluorocarbon, and isoprene. The practice of this invention is found particularly beneficial when applied to the stabilization of homopolymers of a conjugated diene such as isoprene or butadiene and copolymers of said dienes with at least one copolymerizable ethylenically unsaturated monomer such as styrene, acrylonitrile, or unsaturated carboxylic acids. The practice of this invention is found most beneficial when applied to the stabilization of copolymers of butadiene and styrene. Oil extended synthetic rubbers and carbon masterbatches may also be stabilized with the NHT lignin according to this invention.

As was discussed above, technical lignin is known in the prior art as a rubber stabilizer. Technical lignins are those materials isolated from a pulping process such as the soda, sulfite or kraft processes. However, the materials for use as stabilizers in this invention are, in fact, not technical lignins at all but are derived from these lignins. The stabilizers of this invention are made from technical lignins from hard or soft woods that have been heat-treated in the presence of a nucleophile. Such treatment effects certain condensation reactions and cleavage reaction within the lignin molecules that impart increased stabilizer or antioxidant effectiveness. One cleavage reaction in particular can be used to monitor the progress of the treatment and this is the demethylation of guaicyl or syringyl structures to form catechols. For the purpose of this specification, "NHT lignins" shall mean materials that have a portion of their original guaicol structure demethylated and contain at least 0.35 mole of catechol per 1000 grams of NHT lignin. Lignins conventionally recovered from pulping liquors are high molecular weight polymeric materials and although there are some catechol structures in conventionally recovered lignins the amount is relatively small. It is preferable that the NHT lignins used as stabilizers have a catechol content of 1.0 mole per 1000 grams of material. Further, the NHT lignins contain less than 10% by weight of aromatic dimers and trimers. Nucleophiles such as those listed by Hine (Physical Organic Chemistry, McGraw-Hill, 1962, p. 161) may be employed. In particular, hydroxide, thiosulfate, cyanide and sulfide are used.

NHT lignins may be obtained by a variety of treatments such as the high temperature treatment set forth in U.S. Pat. 2,976,273 to Ball and Pueschel. In the Ball et al. patent residual kraft black liquor is heated at a temperature between 200° C. and 350° C. In this process the nucleophiles naturally occur in the black liquors. Another process for making NHT lignins is set forth in U.S. Pat. 2,802,815 to J. B. Doughty which sets forth a low temperature process by reacting technical lignin at a temperature between 140° C. and 200° C. for several hours with hydroxide serving as the nucleophile.

The NHT lignin for use in the process of this invention protect elastomers against degradation at various stages of manufacture and processing. The NHT lignin stabilizer may be added to the elastomer while the elastomer is in latex or emulsion form, suspension form, dispersion form or solution form. The NHT lignin may also be added to dry polymers using any of the conventional dry mixing means such as an open mill, an extruder or an internal mixer such as a Banbury mixer to serve as an antioxidant after vulcanization. However, the NHT lignin present in the raw rubber is believed to continue to be an effective antioxidant after vulcanization. The NHT lignins are, however, especially useful as stabilizers in synthetic raw rubbers. Also because of their low volatility the NHT lignins are effective in high temperature or thin film applications.

The common test used by the rubber industry to screen stabilizers is to determine the Mooney viscosity as a function of time of accelerated heat aging. The Mooney instrument is essentially a powerful viscometer. A knurled disc is compressed between two pieces of rubber and the disc is rotated. The force necessary to rotate the disc is a measure of the viscosity of the rubber. A high value indicates high viscosity or low plasticity. It should be emphasized that Mooney viscosity either increases or decreases with aging depending on the elastomer type. Stabilizers act to retard any change in Mooney viscosity. The procedure for determining Mooney viscosity may be found in ASTM designation D-1646-63.

The practice of this invention may clearly be seen in the following examples:

Example 1

This example illustrates the production of nucleophile and heat treated materials from softwood black liquor according to the process set forth in U.S. Pat. 2,976,273 to Ball et al. The table below shows catechol content of three NHT modified lignins, shown as Stabilizers A-C; compared to a sample (control) of technical kraft pine lignin that has not been treated.

| Sample | Time, min. | Temp., °C. | Catechols/ 1,000 gm. of NHT lignin |
|---|---|---|---|
| Control | | | 0.3 |
| Stabilizer: | | | |
| A | 4.0 | 270 | 1.8 |
| B | 4.0 | 300 | 2.9 |
| C | 7.5 | 300 | 3.1 |

Example 2

This example illustrates modification of technical kraft lignins effected under the conditions described in U.S. Pat. 2,802,815 to Doughty at a temperature of 160° C. for 6 hours. Stabilizers D and F were lignins recovered from the pulping of pine. The precursor of Stabilizer E was a hardwood lignin.

CHARACTERISTICS OF MODIFIED LIGNINS

| Sample | Moles NaOH/ 1,000 gm. lignin | Catechols/ 1,000 gm. of NHT lignin |
|---|---|---|
| Stabilizer: | | |
| D | 7.2 | 0.4 |
| E | 7.2 | 0.9 |
| F | 3.6 | 0.4 |

Example 3

To determine stabilizing effectiveness of NHT lignins, 1.5 parts of the NHT modified lignins per hundred parts of elastomer were added as an alkaline slurry to a styrene-butadiene (SBR 1502) latex. The mixture was coagulated with salt acid and the crumb freeze dried.

AGING OF SBR 1502

| | Percent change in Mooney viscosity | |
|---|---|---|
| Days at 100° C | 5 | 10 |
| Stabilizer: | | |
| None | 178 | |
| Control | 69 | |
| Stabilizer: | | |
| C | 25 | 58 |
| D | 40 | 76 |

The results clearly show that NHT treatment dramatically improved stabilizer effectiveness, as measured by Mooney viscosity, against degradation over both SBR containing no stabilizer and SBR containing the control stabilizer.

Example 4

As oil extended rubber constitutes a large portion of SBR production, the stabilizers useful in this invention were added to an oil extended SBR and the Mooney viscosity determined at stabilizer concentrations of 1.5 parts per hundred of rubber. The results are shown in the table below. The table lists Mooney viscosities for several stabilizers in SBR 1712 extended with 37.5 parts per hundred rubber of Sundex 8125 oil.

AGING OF OIL EXTENDED SBR 1712

| Days aged at 70° C. | Percent change in Mooney viscosity | | |
|---|---|---|---|
| | 2 | 5 | 10 |
| Stabilizer: | | | |
| None | −62 | −78 | |
| Control | −10 | −29 | −52 |
| Stabilizer: | | | |
| D | −2 | −11 | −57 |
| C | −6 | −5 | −12 |

As shown, the modified lignins of this invention are effective stabilizers for oil-extended SBR latex.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

Having thus described the invention, what is claimed is:

1. The method of stabilizing a diene polymer against degradation which comprises, incorporating into a diene polymer from 0.01 to 5.0 parts per hundred parts of said diene polymer of a lignin which has been heated in an aqueous solution of a nucleophile, said nucleophile heat treated lignin being derived from a technical lignin and having at least 0.35 catechol groups per 1000 grams of NHT lignin.

2. The method of claim 1 wherein said nucleophile heat treated lignin is added to said diene polymer in an amount of 0.25 to 2.00 parts per hundred of diene polymer.

3. The method of claim 1 wherein the nucleophile heat treated lignin is dispersed in latex.

4. The method of claim 1 wherein the nucleophile heat treated lignin is dissolved in the latex and precipitated in the subsequent coagulation of the latex.

5. The method of claim 1 wherein said diene polymer is a styrene-butadiene copolymer.

6. The method of claim 5 wherein said styrene-butadiene copolymer is oil extended.

7. The method of claim 1 wherein said diene polymer is a butadiene homopolymer.

References Cited
UNITED STATES PATENTS

| | | | |
|---|---|---|---|
| 2,802,815 | 8/1957 | Doughty | 260—124 |
| 2,844,549 | 7/1958 | Provost | 260—17.5 |
| 3,163,614 | 12/1964 | Dimitri | 260—17.5 |
| 3,223,697 | 12/1965 | Ball et al. | 260—124 |
| 3,282,871 | 11/1966 | Dimitri | 260—17.5 |
| 3,484,397 | 12/1969 | Szalay et al. | 260—17.5 |

HAROLD D. ANDERSON, Primary Examiner

E. A. NIELSEN, Assistant Examiner

U.S. Cl. X.R.
260—45.95, 814, 815